United States Patent
Hodge

(10) Patent No.: US 10,521,651 B2
(45) Date of Patent: Dec. 31, 2019

(54) HIGH DEFINITION CAMERA AND IMAGE RECOGNITION SYSTEM FOR CRIMINAL IDENTIFICATION

(71) Applicant: **GLOBAL TEL*LINK CORPORATION**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 15/787,130

(22) Filed: Oct. 18, 2017

(65) Prior Publication Data
US 2019/0114472 A1   Apr. 18, 2019

(51) Int. Cl.
| | | |
|---|---|---|
| H04N 5/247 | (2006.01) | |
| G06K 9/00 | (2006.01) | |
| G06K 9/46 | (2006.01) | |
| G06Q 50/26 | (2012.01) | |
| H04L 9/06 | (2006.01) | |
| G06K 9/62 | (2006.01) | |
| G06F 3/147 | (2006.01) | |

(52) U.S. Cl.
CPC ....... *G06K 9/00362* (2013.01); *G06K 9/4652* (2013.01); *G06K 9/6202* (2013.01); *G06Q 50/26* (2013.01); *H04L 9/0643* (2013.01); *H04N 5/247* (2013.01); *G06F 3/147* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,054,928 A | * | 4/2000 | Lemelson | G08B 21/0233 340/539.1 |
| 6,583,813 B1 | * | 6/2003 | Enright | G06Q 20/18 348/143 |
| 6,614,348 B2 | * | 9/2003 | Ciccolo | G08B 13/19613 340/541 |

(Continued)

FOREIGN PATENT DOCUMENTS

| | | | |
|---|---|---|---|
| CN | 201328126 Y | * | 10/2009 |
| CN | 201328126 Y | * | 10/2009 |

(Continued)

*Primary Examiner* — Tsung Yin Tsai
(74) *Attorney, Agent, or Firm* — Sterne, Kessler, Goldstein & Fox P.L.L.C.

(57) ABSTRACT

A system for high definition (HD) image recognition of criminals is disclosed. The system includes a plurality of cameras, an image recognition server, investigator user devices, a computing device, a database, and a network. At least one processor of the image recognition server is configured to receive a plurality of photographs of a first individual, perform image processing of the plurality of photographs to extract a first set of physical features, store feature data regarding the first set of physical features in the database, receive suspect data regarding a suspected individual from a first investigator user device, match the suspect data with the feature data stored in the database, and transmit an alert to the computing device in the prison, wherein the alert activates a mobile application on each investigator user device to display match data identifying the suspected individual as the first individual based on the feature data.

19 Claims, 7 Drawing Sheets

(56) References Cited

U.S. PATENT DOCUMENTS

| | | | |
|---|---|---|---|
| 6,757,008 B1* | 6/2004 | Smith | H04N 5/225 348/143 |
| 7,147,147 B1* | 12/2006 | Enright | G06Q 20/042 235/379 |
| 7,911,346 B1* | 3/2011 | Claudatos | G06Q 10/087 340/572.1 |
| 9,858,632 B1* | 1/2018 | Shipman, Jr. | G06Q 50/26 |
| 2004/0001142 A1* | 1/2004 | Kumhyr | G06K 9/00288 348/143 |
| 2004/0150520 A1* | 8/2004 | Barrie | G07C 9/00103 340/539.13 |
| 2005/0063566 A1* | 3/2005 | Beek | A61B 5/0059 382/115 |
| 2005/0111701 A1* | 5/2005 | Seki | G08B 13/19645 382/107 |
| 2006/0119616 A1* | 6/2006 | Park | G06Q 30/0603 345/619 |
| 2006/0222211 A1* | 10/2006 | Olivo, Jr. | G06K 9/00885 382/115 |
| 2009/0041297 A1* | 2/2009 | Zhang | G06K 9/00362 382/103 |
| 2009/0210245 A1 | 9/2009 | Wold | |
| 2011/0043628 A1* | 2/2011 | Yun, II | G01S 3/7865 348/143 |
| 2011/0213981 A1* | 9/2011 | Griffin | H04L 9/3231 713/172 |
| 2012/0320215 A1* | 12/2012 | Maddi | H04N 5/33 348/155 |
| 2014/0280559 A1* | 9/2014 | Torgersrud | H04L 67/22 709/204 |
| 2014/0347479 A1 | 11/2014 | Givon | |
| 2015/0163532 A1* | 6/2015 | Shmueli | H04N 21/23418 386/326 |
| 2016/0188965 A1* | 6/2016 | McClure | G06K 9/00335 382/103 |

FOREIGN PATENT DOCUMENTS

| | | | |
|---|---|---|---|
| CN | 102547224 A | * | 7/2012 |
| CN | 102547224 A | * | 7/2012 |
| CN | 202677413 U | * | 1/2013 |
| CN | 202677413 U | * | 1/2013 |
| CN | 105760832 A | * | 7/2016 |
| CN | 105760832 A | * | 7/2016 |
| CN | 205862494 U | * | 1/2017 |
| CN | 205862494 U | * | 1/2017 |
| KR | 101358446 B1 | * | 2/2014 |
| KR | 101358446 B1 | * | 2/2014 |

* cited by examiner

HIGH DEFINITION CAMERA AND IMAGE RECOGNITION SYSTEM FOR CRIMINAL IDENTIFICATION

BACKGROUND

Field

The disclosure relates to a high definition (HD) camera and image recognition system and methods for identifying individuals involved in criminal activities during booking and investigations.

Background

Law enforcement members routinely seek information regarding suspects that may be relevant to on-going investigations, especially if the suspects have previously been incarcerated. For example, a police officer arrests an individual involved in a criminal activity and transports the individual to a prison, where information regarding the individual is collected during a booking process. The individual is then asked to provide identification, including his or her full name, address, contact information, and the like, and one or more booking photographs or "mugshots" are taken of the individual. However, individuals often fail to provide proper identification to arresting officers, and current technologies at prisons are limited in quickly identifying criminals and previously incarcerated suspects for time-sensitive investigations.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
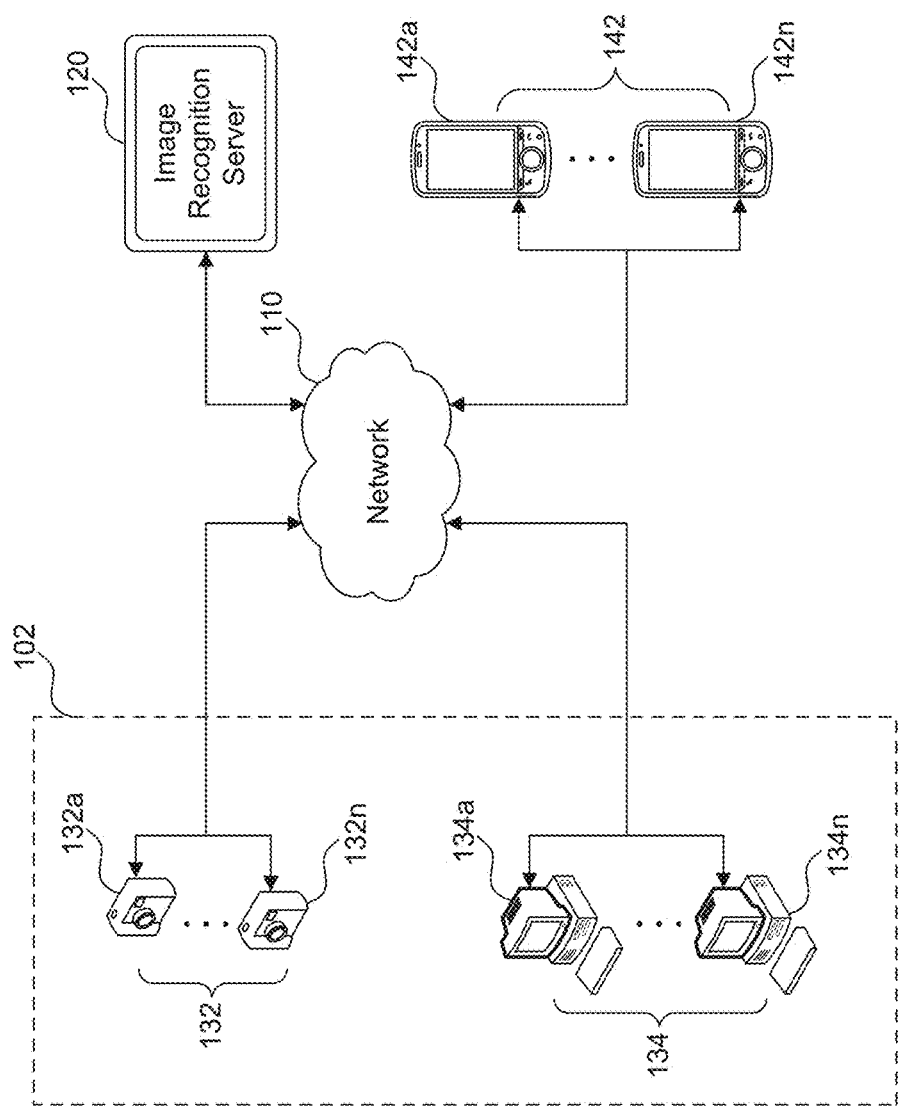
FIG. 1 illustrates a block diagram of a high definition (HD) camera and image recognition system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

Law enforcement members routinely seek information regarding suspects that may be relevant to on-going investigations, especially if the suspects have previously been incarcerated. For example, a police officer arrests an individual involved in a criminal activity and transport the individual to a prison, where information regarding the individual is collected during a booking process. The individual is asked to provide identification, including his or her full name, address, contact information, and the like, and one or more booking photographs or "mugshots" are taken of the individual. However, individuals often fail to provide proper identification to arresting officers, and identifying individuals who have previously been incarcerated based on conventional mugshots is inefficient because of the modification of physical appearance.

For example, criminals frequently modify their physical appearance or physical features by getting numerous tattoos all over their bodies, such as on their faces, chests, arms, legs or the like. In some cases, criminals obtain specific tattoos that are gang-affiliated to show others their gang affiliations. Criminals also remove tattoos and/or add new tattoos to non-tattooed regions of their bodies. In another example, criminals modify their physical features by getting plastic surgery or having operations performed to alter their appearances. Such individuals might not be recognizable by previous mugshots during booking because their physical appearance may have drastically changed since the last time their mugshots were taken, such as when previously incarcerated.

Additionally, current technologies at prisons are limited in providing prompt and efficient identification of criminals from conventional mugshots. Current systems implemented by jurisdictions for identifying criminals do not include sophisticated technologies that are needed for detecting modified physical appearances of criminals through enhanced image recognition techniques. In some cases, cameras utilized by jurisdictions are of a lower resolution and quality, and mugshots or images of criminals captured by such cameras do not provide a full and comprehensive view of the physical attributes of each individual.

For example, cameras conventionally used by prisons are unable to capture or photograph in high resolution various changes that an individual may acquire after a previous booking, such as a plurality of tattoos that have been added to the individual's body. Furthermore, arresting officers or jail personnel members who are utilizing cameras to take mugshots of individuals at the prison often take the photographs in an area of the booking room that might not have sufficient light or a proper background to prevent photographs captured by the camera from being underexposed or overexposed. Such deficient photographs captured by conventional cameras do not provide a complete view of a criminal, including fully depicting identifying marks such as tattoos on a criminal's body.

Additionally or alternatively, jurisdictions may rely on fingerprint matching and/or DNA analysis to identify a criminal by taking an individual's fingerprints and/or a blood sample and searching for a match. However, such technologies take a longer amount of time to process the fingerprints and/or sample and find a match, than the time a photograph-based identification would take. Identifying criminals as quickly as possible in a short amount of time is of paramount importance, particularly for recognizing and pursuing possible suspects in ongoing investigations that are time-sensitive. Accordingly, there is a need for new technologies, systems, and methods for an improved and efficient identification of criminals during booking based on the modification of physical appearances of criminals.

High Definition (HD) Camera and Image Recognition System

FIG. 1 illustrates a block diagram of a high definition (HD) camera and image recognition system 100, according to embodiments of the present disclosure. The HD camera and image recognition system 100 includes a prison 102, an image recognition server 120, and a plurality of investigator user devices 142 (e.g., investigator user devices 142a-142n) that are communicatively coupled via a network 110. In this disclosure, prison 102 refers to a local, county, state, and/or federal prison, jail, or correctional facility, in which individuals that have been arrested are booked and processed before confinement. The prison 102 further includes a plurality of cameras 132 (e.g., cameras 132a-132n). The plurality of cameras 132 include high definition (HD) cameras that are located in a room of the prison 102, where arrested individuals are photographed for identification purposes. For example, the cameras 132 are arranged in various configurations in the room of the prison 102 in order to capture photographs of arrested individuals from a plurality of angles for a comprehensive view of the physical attributes of each arrested individual, as will be described in further detail below.

The prison 102 further includes a plurality of computing devices 134 (e.g., computing devices 134a-134n). The plurality of computing devices 134 include one or more desktop computers, tablet computers, laptop computers, computer terminals, wireless devices, computer workstations, or the like, which are utilized by one or more employees, officers, or personnel in the prison 102. In some embodiments, the computing devices 134 include one or more central processing units (CPU), system memory (e.g., RAM), data storage, an input device, such as a keyboard, mouse, camera, and/or microphone, a monitor for displaying a user interface, a network interface card, and/or a modem that provides network connectivity and communication. The computing devices 134 are located locally within the prison 102, such as in a designated area or room of the prison 102. For example, the computing devices 134 are located in a room or area that is separate from the room where the cameras 132 are located.

In some embodiments, the computing devices 134 are configured to receive photographs captured by one or more cameras 132, modify or convert the format of each photograph, and transmit a formatted version of each photograph to the image recognition server 120 via network 110. The network 110 includes at least one of a private network, personal area network (PAN), local area network (LAN), wide area network (WAN), or the Internet. The image recognition server 120 includes any number of servers, computers, and/or devices for receiving photographs captured by one or more cameras 132 directly from the cameras 132 or from one or more computing devices 134. The image recognition server 120 is configured to process photographs of arrested individuals and utilize pattern recognition and image analysis techniques to match photographs of arrested individuals with photographs of criminals or suspects, as will be described in further detail below.

In some embodiments, the image recognition server 120 is further configured to communicate with and transmit alerts to computing devices 134 and/or a plurality of investigator user devices 142 regarding matching photographs. The plurality of investigator user devices 142 include at least one of a desktop computer, a tablet computer, a laptop computer, a computer terminal, a wireless device, or a mobile device capable of viewing a user interface. For example, the investigator user devices 142 include one or more central processing units (CPU), system memory (e.g., RAM), data storage, an input device, such as a keyboard, mouse, camera, and/or microphone, a monitor for displaying a user interface, a network interface card, and/or a modem that provides network connectivity and communication. In some embodiments, the investigator user devices 142 include user devices (e.g., mobile devices) that are each associated with or used by an individual, such as an investigator, detective, prosecutor, police officer, or administrator who is authorized to investigate suspects or individuals who are involved in criminal activities. In some cases, each investigator user device 142 further includes a mobile application installed in a memory of the investigator user device 142, in which the mobile application is configured to display alerts regarding whether or not a suspected individual has been identified based on matching photographs, as will be described in further detail below.

In additional embodiments, the connection between the plurality of cameras 132 and the plurality of computing devices 134 in prison 102, the network 110, the image recognition server 120, and the plurality of investigator user devices 142 is a wireless connection (e.g., Bluetooth™, Wi-Fi connection, or the like) or a wired connection (e.g., Ethernet, universal serial bus (USB), or the like).

HD Camera System

Figure 2A:
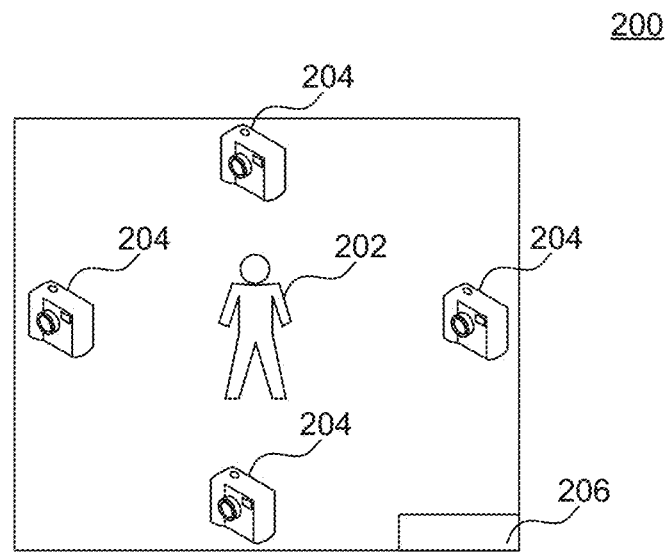
FIGS. 2A and 2B illustrate example diagrams of configurations of a high definition (HD) camera system arranged in a room of a prison, according to embodiments of the present disclosure.
Figure 2B:
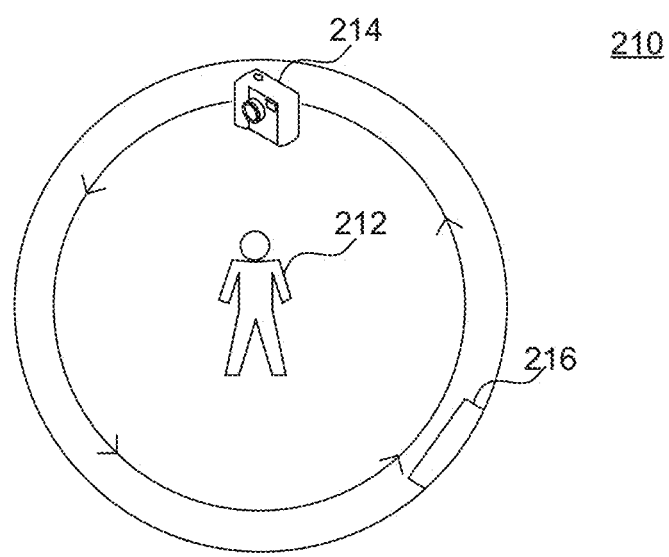

FIGS. 2A and 2B illustrate example diagrams of configurations of a high definition (HD) camera system arranged in a room of a prison, according to embodiments of the present disclosure. In particular, FIG. 2A illustrates a first configuration of the high definition (HD) camera system in which there are four cameras 204 arranged within the perimeter of a room 200 in the prison and configured to photograph an individual 202. In some embodiments, cameras 204 and room 200 represent exemplary embodiments of the plurality of cameras 132 (e.g., cameras 132a-132n) and a room in prison 102 in FIG. 1.

The cameras 204 include high definition (HD) digital cameras that are configured to generate HD quality photographs. For example, the cameras 204 capture HD quality photographs with high resolutions, such as 1920×1080 pixels, 1440×1080 pixels, 1280×720 pixels, or the like. In some examples, the cameras 204 capture photographs with ultra-high definition resolutions, such as a resolution of 3840×2160 pixels or the like. In some embodiments, the cameras 204 comprise different cameras of varying resolutions to capture photographs of the individual 202 with both low and high resolutions. For example, photographs of low resolutions from one or more cameras 204 are processed first by the image recognition server 120, and photographs of high resolutions from one or more cameras 204 are processed by the image recognition server 120 to obtain additional details after processing of the photographs of low resolutions.

Each camera 204 is configured to capture a plurality of photographs of the individual 202 standing in the center of the room 200. The individual 202 is an arrested individual, suspect, or criminal who has been arrested for criminal activities and brought to the prison by an arresting officer for booking and processing. After providing identification information to one or more officers at the prison, the individual 202 enters the room 200 through an entrance 206 on the side of the room 200 and poses for photographs that are captured by the plurality of cameras 204. For example, the individual 202 poses in limited articles of clothing in front of the cameras 204. In another example, the individual 202 poses nude in front of the cameras 204, and nudity is censored (e.g., by blurring, pixilation, or solid colors) from the photographs during processing by the image recognition server 120. In some embodiments, the room 200 has similar dimensions to a photo booth and is rectangular in shape. In other embodiments, the room 200 is square-shaped with dimensions (width×length) of 4 feet×4 feet, 5 feet×5 feet, 6 feet×6 feet, or the like.

As shown in FIG. 2A, the cameras 204 are mounted on the walls of the room 200, in which each camera 204 is mounted in the center of each wall. In some embodiments, the cameras 204 and the equipment utilized to mount the cameras 204 in the room 200 are referred to herein as a high definition (HD) camera system. The cameras 204 mounted to the walls are fixed or stationary, and each camera 204 takes at least one photograph of the individual 202 at or around the same time. For example, the cameras 204 are simultaneously triggered to capture photographs at or around the same time. In some cases, the cameras 204 are simultaneously triggered by receiving a command transmitted from a computing device 134 in the prison 102. In response to receiving the command, the four cameras 204 each triggered to capture at least one photograph of the individual 202 at or around the same time, resulting in at least four photographs with different views depicting the front side, back side, right side, and left side of the individual 202. In some embodiments, each camera 204 captures a burst of photographs comprising multiple photographs (e.g., 5 photographs, 10 photographs, or another predetermined number of photographs) of the individual 202 that are taken within a predetermined time period (e.g., within 2 seconds, 5 seconds, 30 seconds, 1 minutes, or the like). Thus, the cameras 204 capture a burst or a set of photographs for each view of the individual 202, resulting in multiple photographs from the front side, back side, right side, and left side of the individual 202. In some cases, the cameras 204 are programmed with one or more predefined rules set by an administrator of the prison to capture any number of photographs as desired. In additional or alternative embodiments, the cameras 204 are configured to capture one or more videos of the individual 202 at or around the same time as the time that the photographs are taken. Although only four cameras 204 are shown in FIG. 2A, it is understood that there can be any number of cameras 204 in the room as a part of the HD camera system.

FIG. 2B illustrates a second configuration of the high definition (HD) camera system in which there is one camera 214 arranged within the circumference of a room 210 in the prison and configured to photograph an individual 212. The camera 214 is track mounted in the room 210, such that the camera 214 is arranged to move around the room 210 on a track and capture photographs while the camera 214 is in motion and/or while the camera 214 is stopped at predetermined locations along the track. In some cases, the high definition (HD) camera system includes a mounted and/or motorized track for the camera 214 that is mounted on the walls and/or ceiling of the room 210. For example, the motorized track for the camera 214 is configured to control camera movements for shifting left to right and vice versa, as well as pan and tilt movements for the camera 214.

In some embodiments, camera 214 and room 210 represent exemplary embodiments of the plurality of cameras 132 (e.g., cameras 132a-132n) and a room in prison 102 in FIG. 1. The camera 214 is a high definition (HD) digital camera that is configured to generate HD quality photographs. For example, the camera 214 captures HD quality photographs with high resolutions, such as 1920×1080 pixels, 1440×1080 pixels, 1280×720 pixels, or the like. In some examples, the camera 214 captures photographs with ultra-high definition resolutions, such as a resolution of 3840×2160 pixels or the like. In some embodiments, the camera 214 capture photographs of the individual 212 with varying resolutions, including both low and high resolutions. For example, photographs of low resolutions from the camera 214 are processed first by the image recognition server 120, and photographs of high resolutions from the camera 214 are processed by the image recognition server 120 to obtain additional details after processing of the photographs of low resolutions.

The camera 214 is configured to capture a plurality of photographs of the individual 212 standing in the center of the room 210. In some embodiments, the individual 212 is the same arrested individual, suspect, or criminal as individual 202 in FIG. 2A. After providing identification information to one or more officers at the prison, the individual 212 enters the room 210 through an entrance 216 on the side of the room 210 and poses for photographs that are captured by the camera 214. For example, the individual 212 poses in limited articles of clothing in front of the camera 214. In another example, the individual 212 poses nude in front of the camera 213, and nudity is censored (e.g., by blurring, pixilation, or solid colors) from the photographs during processing by the image recognition server 120 In some embodiments, the room 210 comprises a circular or oval shape with a diameter of 4 feet, 5 feet, 6 feet, or the like. In additional embodiments, the room 210 comprises any shape with a track that is mounted around the room, such that the camera 214 moves around the room 210 along the track. As shown in FIG. 2B, the camera 214 is arranged at a location on a track mounted to the walls of the room 210, such that the arrangement allows the camera 214 to pan or move around the circumference of the room 210 (e.g., within the walls of the room 210) to capture photographs and/or videos of the individual 212 from a plurality of angles around the room 210. In some embodiments, the camera 214 rotates around the room 210 on the track to capture one or more high resolution panoramic photographs or 360° photographs.

In some embodiments, the camera 214 comprises a rotating HD camera that is mounted on vertical and horizontal axes (e.g., one or more tracks) of a wall of the room 210, such that the camera 214 can move vertically and horizontally to obtain accurate positioning of the individual 212. For example, the camera 214 shifts in position vertically (e.g., up or down) by a predetermined distance on the track based on detecting the height of an individual 212, such that the camera 214 can capture accurate photographs of the individual 212 from a proper vantage point. The camera 214 also rotates or shifts in position horizontally (e.g., left or right) to capture a plurality of photographs of the individual 212 from different angles around the room 210. For example, the camera 214 is mounted to camera equipment (e.g., a camera dolly or another device) that allows rotation of the camera 214 around the room 210. In some embodiments, the camera 214 and the equipment utilized to move, pivot, or rotate the camera 214 in the room 210 are referred to herein as a rotating high definition (HD) camera system.

In some cases, the camera 214 and the accompanying equipment are automated, such that the camera 214 moves around the room 210 capture a predetermined number of photographs within a predetermined time interval from various angles. For example, the camera 214 captures 2 photographs, 5 photographs, 10 photographs, or another number of photographs every minute, every two minutes, or within another time interval from various angles around the room 210, in which the camera 214 moves in 15-degree, 45 degree, or 90 degree increments on a track around the room 210. In some embodiments, the camera 214 also rotates clockwise or counter-clockwise around the room 210 at a predetermined room 210. By obtaining photos from different angles around the room 210, the camera 214 obtains comprehensive photographs that provide detailed views of the physical attributes of the individual 212, including tattoos, piercings, scars, brandings, surgical modifications, and other physical markings on the individual's body. In some cases, the camera 214 is programmed with one or more predefined rules set by an administrator of the prison to capture any number of photographs as desired. Although only camera 214 is shown in FIG. 2B, it is understood that there can be any number of cameras 214 in the room as a part of the rotating HD camera system.

Image Recognition Server

Figure 3:
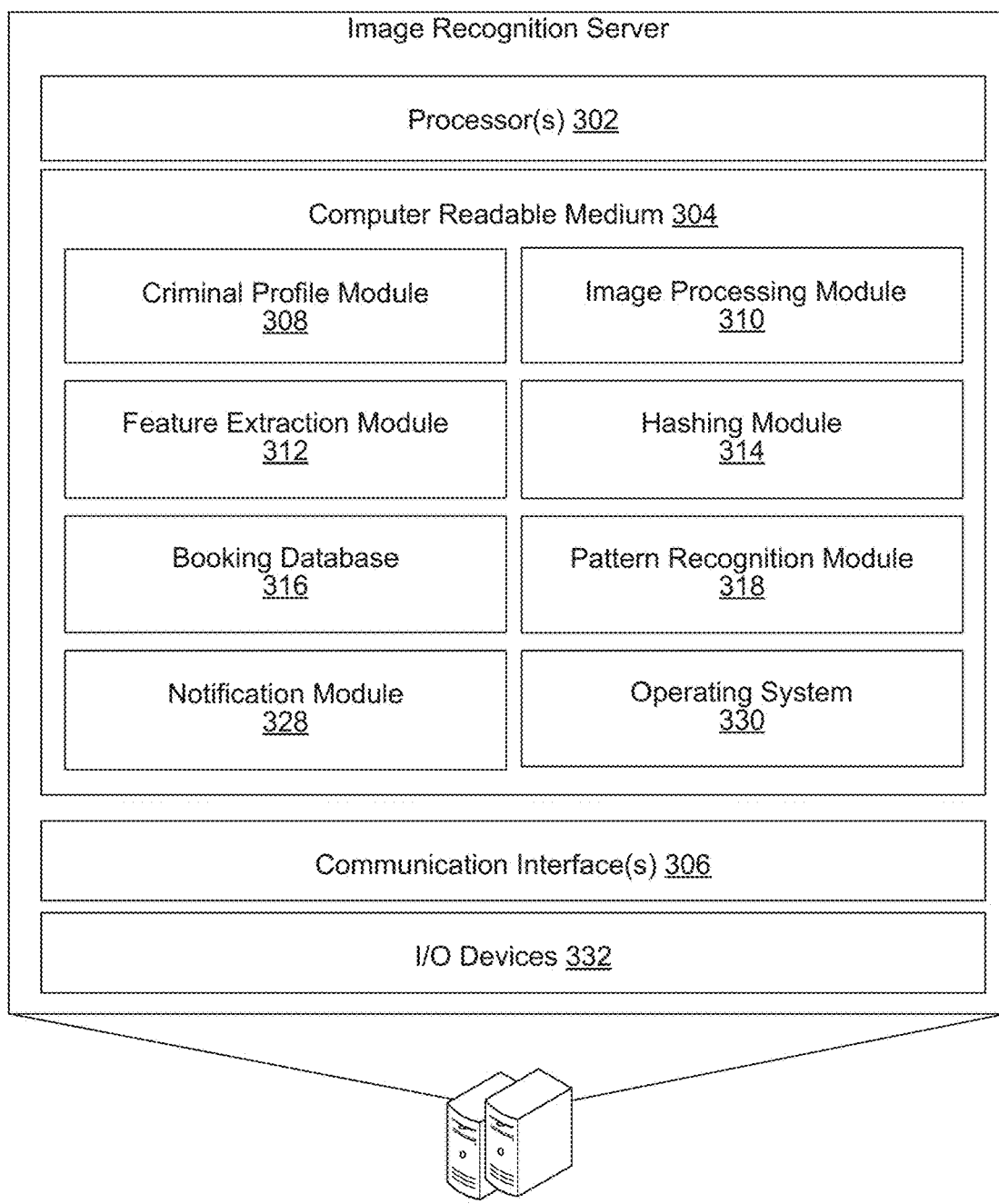
FIG. 3 illustrates a block diagram of an image recognition server in the HD camera and image recognition system, according to embodiments of the present disclosure.

FIG. 3 illustrates a block diagram of the image recognition server 300, according to embodiments of the present disclosure. Image recognition server 300 represents an exemplary embodiment of image recognition server 120 in FIG. 1. Image recognition server includes one or more servers or other types of computing devices that can be embodied in any number of ways. For instance, the modules, other functional components, and data can be implemented on a single server, a cluster of servers, a server farm or data center, a cloud-hosted computing service, and so forth, although other computer architectures can additionally or alternatively be used.

Further, while the figures illustrate the components and data of the image recognition server 300 as being present in a single location, these components and data may alternatively be distributed across different computing devices and different locations in any manner. Consequently, the functions may be implemented by one or more computing devices, with the various functionality described above distributed in various ways across the different computing devices. Multiple image recognition servers 300 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, the image recognition server 300 includes one or more processors 302, one or more computer-readable media 304, and one or more communication interfaces 306. Each processor 302 is a single processing unit or a number of processing units, and may include single or multiple computing units or multiple processing cores. The processor(s) 302 can be implemented as one or more microprocessors, microcomputers, microcontrollers, digital signal processors, central processing units, state machines, logic circuitries, and/or any devices that manipulate signals based on operational instructions. For instance, the processor(s) 302 may be one or more hardware processors and/or logic circuits of any suitable type specifically programmed or configured to execute the algorithms and processes described herein. The processor(s) 302 can be configured to fetch and execute computer-readable instructions stored in the computer-readable media 304, which can program the processor(s) 302 to perform the functions described herein.

The computer-readable media 304 include volatile and nonvolatile memory and/or removable and non-removable media implemented in any type of technology for storage of information, such as computer-readable instructions, data structures, program modules, or other data. Such computer-readable media 304 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the image recognition server 300, the computer-readable media 304 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 304 is used to store any number of functional components that are executable by the processors 302. In many implementations, these functional components comprise instructions or programs that are executable by the processors and that, when executed, specifically configure the one or more processors 302 to perform the actions attributed above to the image recognition server 300. In addition, the computer-readable media 304 store data used for performing the operations described herein.

In the illustrated example, the computer-readable media 304 further includes criminal profile module 308, image processing module 310, feature extraction module 312, hashing module 314, booking database 316, pattern recognition module 318, and notification module 328. Criminal profile module 308 obtains and stores profile information for each criminal in the prison. In some embodiments, criminal profile module 308 obtains profile information related to arrested individuals from one or more of (a) a jail management system (JMS) or an offender management system (OMS) operated by the jurisdiction of the prison or correctional facility, (b) public database containing information on the individuals, or (c) a questionnaire provided by a web page or booking information. For example, profile information obtained by criminal profile module 308 includes personal information and booking information for each criminal, such as names, previous residences or correctional facilities, family members, languages, previous arrest history, fingerprint information, information regarding witnesses or other individuals pertinent to the criminal's case, and the like. Based on this profile information, criminal profile module 308 generates a criminal profile for each individual arrested and booked at the prison.

In some embodiments, criminal profile module 308 communicates with image processing module 310 to associate a criminal profile that corresponds to each arrested individual with one or more photographs captured by the cameras in the prison (e.g., cameras 132, 204, and/or 214). For example, criminal profile module 308 receives data regarding photographs of arrested individuals from image processing module 310 and stores the data regarding the photographs with the criminal profile for each arrested individual within the criminal profile module 308 and/or booking database 316. In some embodiments, each criminal profile includes one or more photographs identifying the arrested individual. In other embodiments, each criminal profile includes one or more links to the location(s) of photographs identifying the arrested individuals, in which the photographs are stored in booking database 316.

Image processing module 310 receives, processes, and manages a plurality of photographs captured by one or more HD cameras in a prison. For example, image processing module 310 receives a plurality of photographs for each arrested individual during booking at prison 102. In some cases, image processing module 310 receives the photographs as digital images directly from at least one camera, such as cameras 132, cameras 204, or camera 214, whereas in other cases, image processing module 310 receives photographs captured by the cameras as digital images from a computing device (e.g., computing device 134) in the prison 102. For example, image processing module 310 receives photographs from computing device 134 after the photographs have been modified or converted to a different format.

In such cases, image processing module 310 performs image processing of a formatted version of each photograph taken by the one or more HD cameras. For example, image processing module 310 is configured to perform format conversion, decryption, and/or encryption of photographs received from the cameras in the HD camera and image recognition system 100. Some examples of image formats for the photographs include JPEG, JPEG-XR, TIFF, BMP, PNG, GIF, or the like. In additional embodiments, image processing module 310 also receives and manages metadata for each photograph, in which metadata includes data associated with each photograph, such as a date and time that each photograph is captured, a type of encoding (e.g., photo compression), a rate of encoding (e.g., compression rate), which camera(s) were utilized to capture the photographs, one or more locations of the camera(s) utilized to capture each photograph, and other attributes or characteristics of each photograph.

Upon receiving digital images corresponding to the plurality of photographs (e.g., via camera 132 or computing device 134), the image processing module 310 utilizes one or more digital image processing algorithms to obtain image data for each photograph of an arrested individual. Examples of digital image processing algorithms that are applied to each photograph include Fourier analysis, image segmentation, edge detection, compression, and other techniques. In some cases, image processing module 310 also applies additional formatting to each photograph, including sharpening, zooming, blurring, cropping, rotating, and other editing processes. In some embodiments, image processing module 310 performs pre-processing of photographs prior to further processing and analysis of the photographs by the feature extraction module 312.

Feature extraction module 312 performs further image analysis of photographs of the arrested individuals in the prison. In particular, feature extraction module 312 receives a plurality of photographs from image processing module 310 after the photographs have been pre-processed, and feature extraction module 312 analyzes the photographs to identify a set of features from each photograph of arrested individuals. In some embodiments, feature extraction module 312 analyzes a plurality of pixels of each photograph to identify pixel intensity values. For example, feature extraction module 312 analyzes intensity values of pixels in a grayscale, binary, or RGB digital image corresponding to each photograph. For each photograph, the feature extraction module 312 detects regions of pixels that differ in color and/or intensity values by one or more predetermined threshold values from adjacent regions of pixels.

The feature extraction module 312 compares intensity values of pixels with intensity values of neighboring pixels to identify similarities and differences between regions in each photograph. In some cases, feature extraction module 312 detects that a region of neighboring pixels has similar intensity values with an adjacent region of neighboring pixels, in which the similar color and/or intensity values indicates the detection of flesh tones (e.g., untattooed or unmarked skin) of the arrested individual's body represented in the two regions of pixels. The feature extraction module 312 continues to analyze and compare each region of pixels with adjacent regions until the color and/or intensity values of a first region of pixels differ from the color and/or intensity values of a second region of pixels by at least one or more predetermined threshold values, in which the differing color and/or intensity values indicate the detection of a tattoo, piercing, branding, surgical modification, physical marking, and/or scar on the arrested individual's body.

Upon detecting these differences, the feature extraction module 312 identifies a first set of features comprising data regarding visual attributes of the arrested individual, in which the visual attributes include tattoos, piercings, scars, brandings, surgical modifications, and/or physical markings on the body of the arrested individual. The data regarding the visual attributes includes one or more values corresponding to shape, color, size, position, intensity, and the like of the visual attributes of the arrested individual. In some cases, the feature extraction module 312 utilizes machine learning models to identify and extract sets of features from one or more photographs of each arrested individual. The feature extraction module 312 further communicates with hashing module 314 to provide the extracted feature data regarding the set of features for each arrested individual.

Hashing module 314 manages data transformation, encryption, and storage of the set of features for each arrested individual in the prison. In particular, hashing module 314 receives feature data regarding a set of features of each arrested individual from feature extraction module 312 and performs cryptographic hashing to transform the feature data through a hash function for security purposes. For example, hashing module 314 generates a hash value (e.g., a cryptographic hash) for each feature of an arrested individual by transforming the data to a fixed-length value representing the feature. The hashing module 314 further stores the hash value for each feature in booking database 316. In some embodiments, the hashing module 314 communicates with booking database 316, pattern recognition module 318, and/or notification module 328 to compute hash values and compare values for matches of feature data using computed hash values.

Booking database 316 comprises any number of databases and/or servers, and stores and organizes data in one or more relational databases. Booking database 316 runs a database management system, such as MYSQL™, to provide an example. In particular, booking database 316 receives one or more photographs of arrested individuals from image processing module 310, encrypts the photographs for security purposes, and generates records for each arrested individual with the encrypted photographs. Booking database 316 also receives and stores hash values from hashing module 314, such as feature data that has been cryptographically hashed. In some embodiments, booking database includes organized data, such as criminal profile information, arrest records, fingerprint data, photographs, feature data, and the like, in which the data is indexed and linked to allow access to data for criminal profile module 308, image processing module 310, feature extraction module 312, hashing module 314, pattern recognition module 318, and notification module 328.

In additional embodiments, booking database 316 includes a library or data repository storing a plurality of records for reference data indicating known gang-affiliated tattoos, piercings, scars, brandings, surgical modifications, and/or physical markings. For example, each record includes at least one of a name of a particular gang, various images, symbols, signs, and/or slogans associated with the particular gang, and a corresponding description of tattoo(s) and/or physical marking(s) associated with the particular gang. In some cases, the reference data indicating known gang-affiliated tattoos and physical markings are extracted and compiled from previous investigations and/or previous arrest records and stored in booking database 316.

Pattern recognition module 318 manages matching of feature data of arrested individuals with suspects involved in criminal activities. In some embodiments, pattern recognition module 318 receives suspect data from one or more investigator user devices 142, in which the suspect data includes data regarding at least one of a shape, color, size, position, or intensity of a tattoo or identifying mark of a suspect. In some cases, the suspect data includes at least one of a photograph of the suspect and/or a description of the suspect provided by an investigator. In particular, pattern recognition module 318 compares the suspect data with the feature data stored in the booking database 316 and determines whether the suspect data matches feature data corresponding to any arrested individual in the prison. For example, pattern recognition module 318 compares a number of data points in the suspect data with a number of data points in the feature data by using at least one of pattern recognition algorithms, matching algorithms, biometric tattoo recognition algorithms, Hidden Markov models, and the like.

The pattern recognition module 318 performs the matching and also determines a confidence value that reflects the degree of the match between suspect data of a suspected individual and feature data of an arrested individual. A higher confidence value indicates a greater degree of matching than a lower confidence value. For example, the pattern recognition module 318 determines a high confidence value upon matching feature data representing an arrested individual's tattoo or physical marking with a suspected individual's tattoo or physical marking in a sketch, a photograph, or a video frame taken at a crime scene investigation or from a camera recording during the criminal activity. After a match between the suspect data and the feature data has been detected, the pattern recognition module 318 communicates with the notification module 328 to provide information regarding the match, including match data identifying the suspected individual as a previously arrested individual. The pattern recognition module 318 also communicates with notification module 328 if a match has not been detected between the suspect data and the feature data in the booking database 316.

In additional embodiments, pattern recognition module 318 identifies gang affiliations of arrested individuals based on feature data received from the feature extraction module 312. For example, a criminal may have a specific image, symbol, sign, or slogan tattooed on their body to represent a gang affiliation. The pattern recognition module 318 identifies an arrested individual's gang affiliation by analyzing feature data indicating one or more tattoos and/or physical markings of the arrested individual and recognizing a gang affiliation of the one or more gang-affiliated tattoos and/or physical markings by applying pattern recognition algorithms. In some cases, the pattern recognition module 318 utilizes one or more records of known gang-affiliated tattoos and/or physical markings in booking database 316 to determine that one or more tattoos and/or physical markings of an arrested individual matches images, symbols, signs, or a slogan of a particular gang. The pattern recognition module 318 further communicates with notification module 328 to provide information regarding the gang affiliations of arrested individuals.

Notification module 328 manages the generation and transmission of one or more alerts and/or notifications for image recognition of criminals. In particular, notification module 328 receives information regarding detected matches for suspected individuals and/or gang affiliation information from pattern recognition module 318 and generates corresponding notifications and/or alerts based on the received information. For example, if the notification module 328 receives information from pattern recognition module 318 indicating that a match has not been detected between the suspect data and the feature data in the booking database 316, then the notification module 328 transmits an alert to one or more computing devices 134 in the prison 102, in which the alert indicates that no match has been found. In other cases, notification module 328 receives information from pattern recognition module 318, in which the information indicates that a match has been detected between suspect data and feature data corresponding to a previously arrested individual. In response to receiving the information, notification module 328 transmits an alert to one or more computing devices 134 in the prison 102.

In some embodiments, transmission of the alert and/or delivery of the alert to the one or more computing devices 134 activates a mobile application installed on each investigator user device 142 to execute on each investigator user device 142, and the mobile application opens up on the user interface of each investigator user device 142 and displays a corresponding alert. In some cases, notification module 328 communicates with the mobile application installed on the one or more investigator user devices 142. For example, the notification module 328 provides match data shown in the alert on the investigator user deice 142, in which the match data identifies a suspected individual as a previously arrested individual and includes at least one of a name, photograph, address, or other information corresponding to the previously arrested individual.

In additional embodiments, notification module 328 receives gang-affiliation data from the pattern recognition module 318, in which the gang-affiliation data indicates that an arrested individual is associated with a particular gang based on identification of his or her tattoo(s) and/or physical marking(s). Upon receiving the gang-affiliation data, notification module 328 transmits one or more notifications and/or messages to computing devices 134 in prison 102, in which the notifications and/or messages notify users of the computing devices 134 (e.g., employees, officers, or personnel in prison 102) that the arrested individual is associated with a particular gang. Based on the gang-affiliation of the arrested individual, officers in the prison 102 are able to place the arrested individual in a particular cell block or housing unit of the prison 102 according to rules of the jurisdiction. For example, an officer may place an arrested individual affiliated with a first gang in a cell block that does not include criminals who are members of the first gang in order to separate the gang members in the prison 102. In another example, the officer may place the arrested individual affiliated with the first gang in a cell block with criminals who are all members of the first gang in order to prevent the arrested individual (or other criminals in the cell block) from participating in altercations or fights with criminals who are gang members of a rival gang. By identifying tattoos, piercings, scars, brandings, surgical modifications, and/or identifying marks and providing notifications to officers regarding gang-affiliations of arrested individuals, the HD camera and image recognition system allows prisons to attain criminal identities of arrested individuals quickly and manage the placement or locations of criminals in the prison based on their gang affiliations.

Additional functional components stored in the computer-readable media 304 include an operating system 330 for controlling and managing various functions of the image recognition server 300. The image recognition server 300 also includes or maintains other functional components and data, such as other modules and data, which include programs, drivers, and the like, and the data used or generated by the functional components. Further, the image recognition server 300 includes many other logical, programmatic and physical components, of which those described above are merely examples that are related to the discussion herein.

The communication interface(s) 306 include one or more interfaces and hardware components for enabling communication with various other devices, including cameras 132, 204 and/or 214, computing devices 134, investigator user devices 142, or other computing devices over network 110. For example, communication interface(s) 306 facilitate communication through one or more of the Internet, cable networks, cellular networks, wireless networks (e.g., Wi-Fi, cellular) and wired networks. As several examples, the image recognition server 300 and other devices communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCM-CIA slot and card, and the like. The image recognition server 300 may further be equipped with various input/output (I/O) devices 332. Such I/O devices include a display, various user interface controls (e.g., buttons, joystick, keyboard, mouse, touch screen, and the like), audio speakers, connection ports and so forth.

Investigator User Device

Figure 4:
FIG. 4 illustrates a user interface of an investigator user device, according to embodiments of the present disclosure.

FIG. 4 illustrates a diagram of an investigator user device 400, according to embodiments of the present disclosure. In some embodiments, the investigator user device 400 represents an exemplary embodiment of investigator user device 142 in FIG. 1. The investigator user device 400 is operated by an individual, such as an investigator, detective, prosecutor, police officer, or administrator who is authorized to investigate suspects or individuals who are involved in criminal activities.

As shown in FIG. 4, the investigator user device 400 comprises a display 402 which illustrates an example user interface after a match has been found between data regarding a suspect and stored data regarding an arrested individual. For example, the investigator user device 400 transmits suspect data to the image recognition server 300, in which the suspect data includes data regarding at least one of a shape, color, size, position, or intensity of a tattoo or identifying mark of a suspect. In some cases, the suspect data includes at least one of a photograph of the suspect or a description of the suspect provided by an investigator. The image recognition server 300 determines if the suspect data received from the investigator user device 400 matches a previously stored photograph of an arrested individual.

Upon detecting a match of the suspect data with feature data corresponding to a previously arrested individual, the image recognition server 300 transmits an alert to one or more computing devices (e.g., computing devices 134) in the prison. Transmission of the alert and/or delivery of the alert to the one or more computing devices activates a mobile application on the investigator user device 400 to execute on the investigator user device 400. For example, the alert received by one or more computing devices in the prison activates an image recognition mobile application to execute on the investigator user device 400, and the image recognition mobile application opens up on a corresponding user interface shown on the display 402.

After the image recognition mobile application opens on the display 402 of the investigator user device 400, the user interface of display 402 presents the investigator with an alert 404. For example, the alert 404 comprises a push notification, message, and/or alert that provides match data identifying the suspected individual as a previously arrested individual, in which the match data includes at least one of a name, photograph, address, or other information corresponding to the previously arrested individual. For example, the alert 404 provides a photograph and indicates the identity of the suspect to be "John Smith" who may be an individual previously arrested and photographed during booking at a prison by HD cameras (e.g., cameras 132, cameras 204, or camera 214).

The alert 404 further provides the investigator with different options from which the investigator can choose. For example, the alert 404 includes two options, such as a first option for "View details" in which the investigator can obtain additional details and/or match data on the identified suspect, and a second option for "Send data" in which the investigator can choose to send the match data, including the identity of the suspect, to another investigator, detective, prosecutor, police officer, or administrator who is authorized and/or involved in the investigation. In other embodiments, the alert 404 indicates that a match has not been found between a photograph of a suspect and a photograph of an arrested individual. By providing investigators with updated information regarding identities of suspected individuals through a mobile application, the HD camera and image recognition system identifies criminals for ongoing investigations in an efficient and timely process.

System Operation

Operations of determining identities of suspected individuals by matching features of arrested individuals and identifying features of arrested individuals in a prison through HD camera and image recognition system 100 will be described with respect to FIGS. 5 and 6. Although the physical devices and components that form the system have largely already been described, additional details regarding their more nuanced operation will be described below with respect to FIGS. 1-4. While FIGS. 5 and 6 contain methods of operation of determining identities of suspected individuals and identifying features of arrested individuals through the HD camera and image recognition system 100, the operations are not limited to the order described below, and various operations can be performed in a different order. Further, two or more operations of each method can be performed simultaneously with each other.

Figure 5:
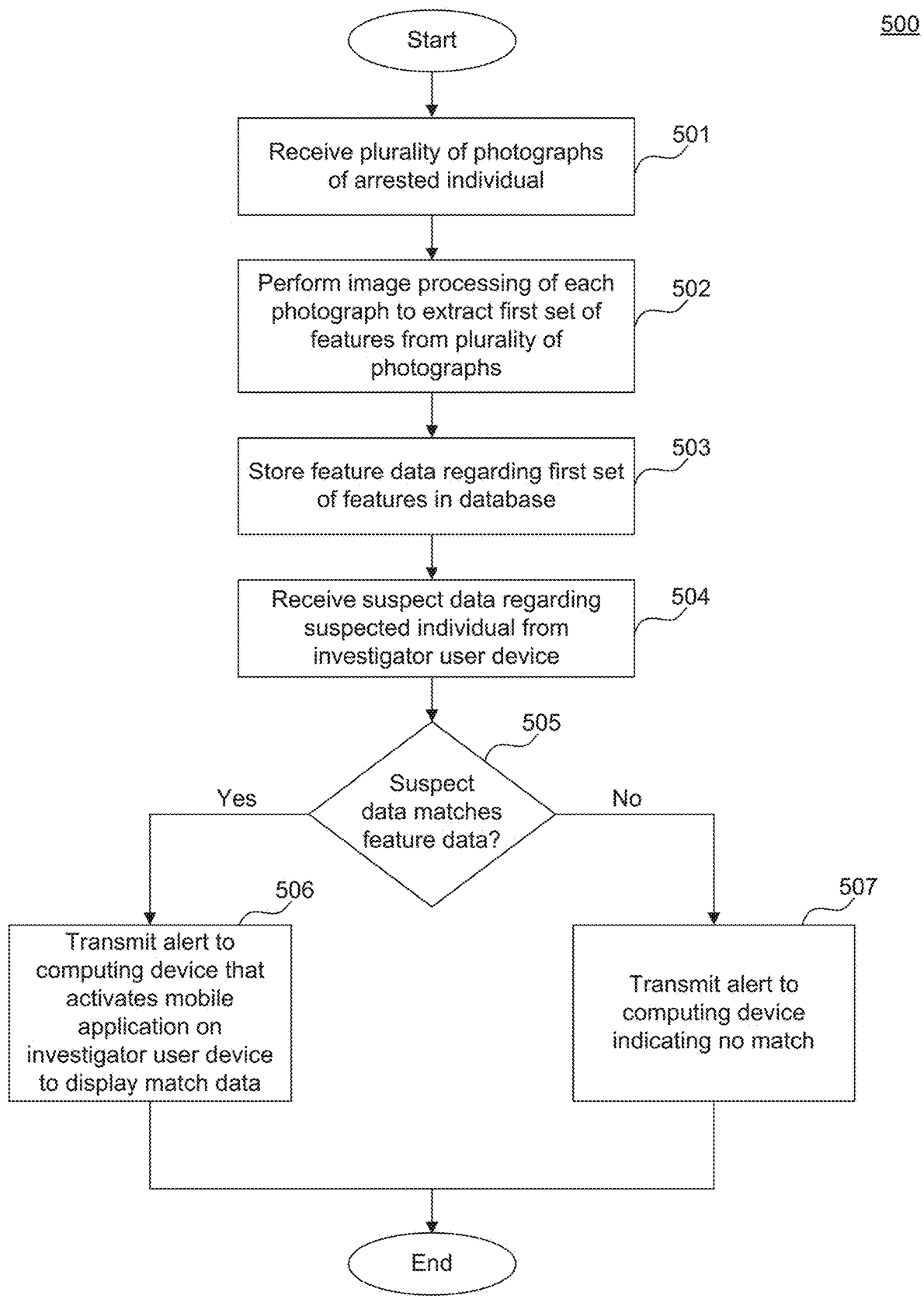
FIG. 5 illustrates a flowchart diagram of a method for determining identities of suspected individuals by matching features of arrested individuals, according to embodiments of the present disclosure.

FIG. 5 illustrates a flowchart diagram of a method 500 of determining identities of suspected individuals by matching features of arrested individuals, via an image recognition server of an HD camera and image recognition system, such as via image recognition server 300 of FIG. 3, according to embodiments of the present disclosure. The steps of method 500 are performed by modules of image recognition server 300, such as criminal profile module 308, image processing module 310, feature extraction module 312, hashing module 314, pattern recognition module 318, and/or notification module 328. Method 500 of FIG. 5 begins with step 501 of receiving a plurality of photographs of an arrested individual. For example, image processing module 310 of image recognition server 300 receives a plurality of photographs of an arrested individual, in which the photographs have been captured by one or more cameras, such as cameras 132, 204, and/or 214 in prison 102. In some embodiments, the image processing module 310 receives the plurality of photographs directly from at least one camera, such as cameras 132, cameras 204, or camera 214. In other embodiments, image processing module 310 receives the plurality of photographs from a computing device 134 in the prison 102.

At step 502, image recognition server performs image processing of each photograph to extract a first set of features from the plurality of photographs. For example, the image processing module 310 of the image recognition server 300 performs pre-processing of the photographs, such as by formatting, edits, and/or applying one or more digital image processing algorithms to each photograph. After the photographs have been pre-processed, the feature extraction module 312 of the image recognition server 300 receives the plurality of photographs from image processing module 310, and the feature extraction module 312 analyzes the photographs to identify a first set of physical features relating to the arrested individual. At step 503, the image recognition server stores feature data regarding the first set of features in a database. For example, the hashing module 314 of the image recognition server 300 performs cryptographic hashing to transform the feature data to hash values, and the hashing module 314 stores the hash value for each feature in booking database 316, in which the hash values are associated with the arrested individual.

At step 504, the image recognition server receives suspect data regarding a suspected individual from an investigator user device. For example, the pattern recognition module 318 of the image recognition server 300 receives suspect data from investigator user device 142 or 400, in which the suspect data includes data regarding at least one of a shape, color, size, position, or intensity of a tattoo or identifying mark of a suspect. At step 505, the image recognition server determines whether the suspect data matches the feature data. For example, the pattern recognition module 318 of the image recognition server 300 determines whether the suspect data matches the feature data stored in the booking database 316 by comparing a number of data points in the suspect data with a number of data points in the feature data by using at least one of pattern recognition algorithms, matching algorithms, biometric tattoo recognition algorithms, Hidden Markov models, and the like.

If the image recognition server determines that the suspect data matches the feature data, then method 500 in this example proceeds to step 506. At step 506, the image recognition server transmits an alert to a computing device that activates a mobile application on an investigator user device to display match data. For example, in response to matching the suspect data with the feature data, the pattern recognition module 318 of image recognition server 300 communicates with the notification module 328 to provide information regarding the match, including match data identifying the suspected individual as a previously arrested individual. In response to receiving the information, notification module 328 transmits an alert to one or more computing devices 134 in the prison 102. Transmission of the alert and/or delivery of the alert to the one or more computing devices 134 activates a mobile application installed on each investigator user device 142 to execute on each investigator user device 142, and the mobile application opens up on the user interface of each investigator user device 142 and displays a corresponding alert. The alert shown on the investigator user device 142 includes match data identifying a suspected individual as a previously arrested individual along with at least one of a name, photograph, address, or other information corresponding to the previously arrested individual.

If the image recognition server determines that the suspect data does not match the feature data, then method 500 in this example proceeds to step 507. At step 507, the image recognition server transmits an alert to a computing device indicating no match. For example, the pattern recognition module 318 of image recognition server 300 communicates with the notification module 328 to provide information indicating that a match has not been detected between the suspect data and the feature data in the booking database 316. The notification module 328 then transmits an alert to one or more computing devices 134 in the prison 102 to notify the officers in the prison 102 that a match has not been found for the identity of the suspected individual. In some cases, the officers utilizes one or more computing devices 134 in the prison 102 to transmit requests to the investigator user device 142 for additional information or details regarding the suspected individual to further update a search for the suspect's identity.

Figure 6:
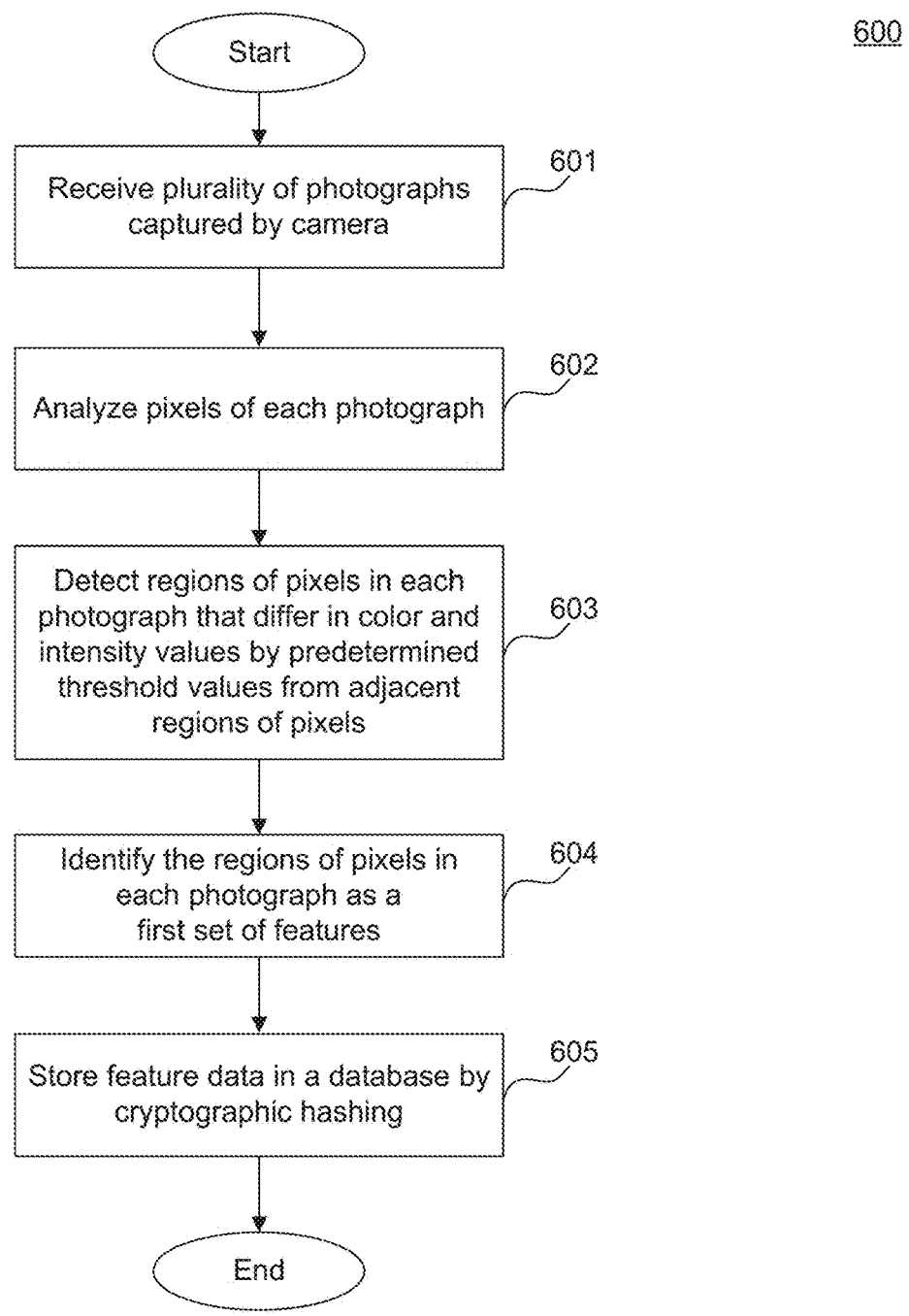
FIG. 6 illustrates a flowchart diagram of a method for identifying features of arrested individuals through image processing, according to embodiments of the present disclosure.

FIG. 6 illustrates a flowchart diagram of a method 600 of identifying features of arrested individuals through image processing, via an image recognition server of an HD camera and image recognition system, such as via image recognition server 300 of FIG. 3, according to embodiments of the present disclosure. The steps of method 600 are performed by modules of image recognition server 300, such as criminal profile module 308, image processing module 310, feature extraction module 312, hashing module 314, pattern recognition module 318, and/or notification module 328. Method 600 of FIG. 6 begins with step 601 of receiving a plurality of photographs captured by a camera. For example, image processing module 310 of image recognition server 300 receives a plurality of photographs of an arrested individual, in which the photographs have been captured by one or more cameras, such as cameras 132, 204, and/or 214 in prison 102. In some embodiments, the image processing module 310 receives the plurality of photographs directly from at least one camera, such as cameras 132, cameras 204, or camera 214.

At step 602, the image recognition server analyzes the pixels of each photograph in the plurality of photographs. For example, the image processing module 310 of image recognition server 300 performs pre-processing of the photographs and transmits the pre-processed photographs to the feature extraction module 312. The feature extraction module 312 then analyzes the pixels of each photograph in the plurality of photographs to identify pixel intensity values. At step 603, the image recognition server detects regions of pixels in each photograph that differ in color and intensity values by predetermined threshold values from adjacent regions of pixels. For example, feature extraction module 312 compares intensity values of pixels with intensity values of neighboring pixels to identify similarities and differences between regions in each photograph. In some cases, feature extraction module 312 detects that a region of neighboring pixels has similar intensity values with an adjacent region of neighboring pixels, in which the similar color and/or intensity values indicates the detection of flesh tones (e.g., untattooed or unmarked skin) of the arrested individual's body represented in the two regions of pixels.

For each photograph, the feature extraction module 312 continues to analyze and compare each region of pixels with adjacent regions until the color and/or intensity values of a first region of pixels differ from the color and/or intensity values of a second region of pixels by at least one or more predetermined threshold values, in which the differing color and/or intensity values indicate the detection of a tattoo, physical marking, and/or scar on the arrested individual's body. At step 604, the image recognition server identifies the regions of pixels in each photograph that differ in color and/or intensity values as a first set of physical features relating to the arrested individual. For example, the feature extraction module 312 of image recognition server 300 detects the regions of pixels that differ in color and/or intensity values and identifies the detected regions as a first set of physical features comprising data regarding visual attributes of the arrested individual. The visual attributes include tattoos, physical markings, and/or scars on the body of the arrested individual, and the data regarding the visual attributes includes one or more values corresponding to shape, color, size, position, intensity, and the like of the visual attributes of the arrested individual.

At step 605, the image recognition server stores the feature data in a database by cryptographic hashing. For example, the feature extraction module 312 provides the extracted feature data to the hashing module 314 of image recognition server 300, and the hashing module 314 performs cryptographic hashing to transform the feature data to hash values. The hashing module 314 further stores the hash value for each feature in booking database 316, in which the hash values are associated with criminal profile data corresponding to the arrested individual. In additional embodiments, the pattern recognition module 318 accesses the hash values and feature data for the arrested individual and applies pattern recognition algorithms to determine that the features match a tattoo, image, symbol, sign, or slogan representing a gang affiliation. By recognizing gang affiliations through tattoo detection, the image recognition server 300 of the HD camera and image recognition system 100 identifies criminals quickly and efficiently for booking and investigation purposes.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 7:
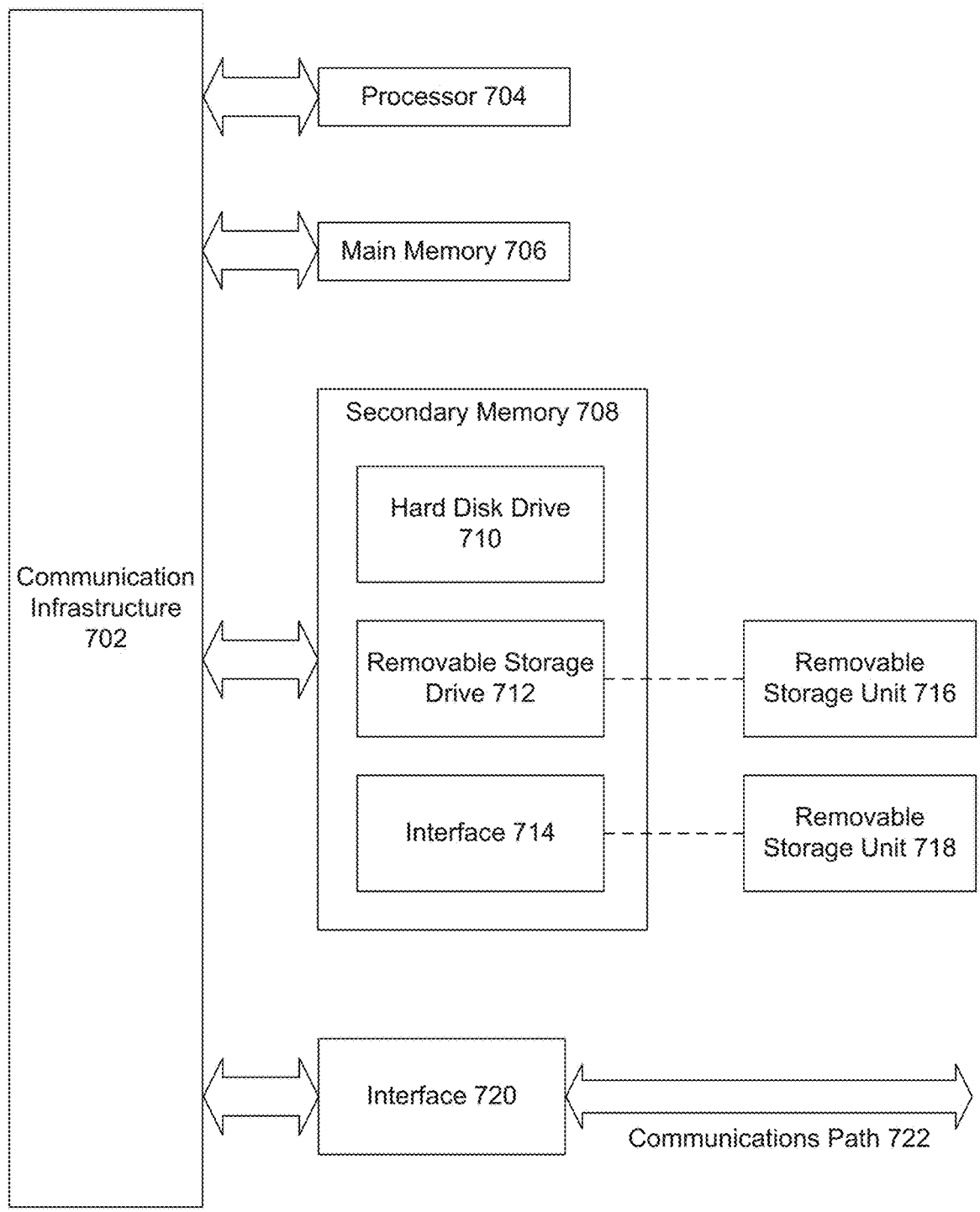
FIG. 7 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-5 can be implemented in the environment of one or more computer systems or other processing systems. An example of such a computer system 700 is shown in FIG. 7. One or more of the modules depicted in the previous figures can be at least partially implemented on one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for high definition (HD) image recognition of criminals, the system comprising:
   a plurality of cameras arranged on a motorized track in a booking room of a prison, wherein the motorized track is configured to facilitate movements of each camera, wherein each camera is configured to capture a photograph of a first individual during a booking of the first individual at the prison and prior to incarceration of the first individual at the prison, resulting in a plurality of photographs of the first individual;
   an image recognition server comprising at least one processor and memory;
   a computing device;
   a database; and
   a network that communicatively couples the plurality of cameras, the image recognition server, the computing device, and the database,
   wherein the at least one processor of the image recognition server is configured to:
      receive the plurality of photographs of the first individual captured by the plurality of cameras;
      perform image processing of the plurality of photographs to extract a first set of physical features relating to the first individual; and store feature data regarding the first set of physical features in the database, wherein the feature data is associated with the first individual.

2. The system of claim 1, wherein the plurality of cameras comprise high definition (HD) cameras arranged in the booking room of the prison and configured to capture the plurality of photographs of the first individual from a plurality of angles in the booking room of the prison.

3. The system of claim 1, wherein performing image processing of the plurality of photographs comprises:
analyzing pixels of each photograph in the plurality of photographs;
detecting a region of pixels in at least one of the plurality of photographs that differ in color and intensity values by a predetermined threshold value from an adjacent region of pixels; and
identifying the region of pixels as the first set of physical features.

4. The system of claim 3, wherein the first set of physical features comprises data regarding visual attributes of the first individual, wherein the visual attributes of the first individual comprise tattoos, piercing, scars, or markings on a body of the first individual.

5. The system of claim 1, wherein the at least one processor is further configured to:
apply a cryptographic hashing of the feature data of the first individual; and
store the feature data regarding the first set of physical features in the database based on the cryptographic hashing.

6. The system of claim 1, wherein each of the plurality of cameras is further configured to detect a height of the first individual, and wherein the motorized track is further configured to shift a position of one or more of the plurality of cameras by a predetermined distance based on the height of the first individual.

7. An image recognition server for identifying an individual in a prison, the image recognition server comprising:
a database storing booking data for a plurality of criminals;
a network interface device configured to communicate with the database, a plurality of cameras arranged on a motorized track in a booking room of the prison, and a computing device in the prison, wherein the motorized track is configured to facilitate movements of each camera; and
at least one processor configured to:
receive a plurality of photographs captured by the plurality of cameras during a booking of the individual at the prison and prior to incarceration of the individual at the prison, wherein each photograph depicts the individual;
extract a set of physical features of the individual from the plurality of photographs by performing image processing of each photograph; and
store feature data comprising the set of physical features in the database by cryptographic hashing, wherein the feature data is associated with the individual.

8. The image recognition server of claim 7, wherein the plurality of cameras comprises four high definition (HD) cameras that are mounted on a track arranged in the booking room of the prison.

9. The image recognition server of claim 8, wherein the plurality of photographs captured by the plurality of cameras are captured at predetermined locations along the track arranged in the booking room of the prison.

10. The image recognition server of claim 7, wherein extracting the set of physical features comprises:
analyzing pixels of each photograph in the plurality of photographs;
detecting regions of pixels in each photograph that differ in color and intensity values by predetermined threshold values from adjacent regions of pixels; and
identifying the regions of pixels in each photograph as the set of physical features.

11. The image recognition server of claim 7, wherein the set of physical features of the individual comprise data regarding visual attributes of the individual.

12. The image recognition server of claim 11, wherein the visual attributes of the individual comprise at least one of tattoos, piercings, scars, or markings on a body of the individual.

13. The image recognition server of claim 7, wherein the storing the feature data by cryptographic hashing comprises:
generating a hash value for each physical feature in the set of physical features, wherein the hash value comprises a fixed-length value; and
storing the hash value for each physical feature in the database.

14. A method for performing high definition (HD) image recognition of criminals, the method comprising:
capturing, by a plurality of cameras arranged on a motorized track in a booking room of a prison, a plurality of photographs of an individual during a booking of the individual at the prison and prior to incarceration of the individual at the prison, wherein the motorized track is configured to facilitate movements of each camera;
receiving, from the plurality of cameras by an image recognition server, the plurality of photographs of the individual;
extracting, by at least one processor of the image recognition server, a set of physical features of the individual from at least one photograph by performing image processing of the at least one photograph; and
storing feature data regarding the set of physical features of the individual in a database that stores booking data for a plurality of criminals, wherein the feature data is associated with the individual in the database.

15. The method of claim 14, wherein the plurality of cameras comprise high definition (HD) cameras configured to capture the plurality of photographs of the individual from a plurality of angles in the booking room of the prison.

16. The method of claim 14, wherein the extracting of the set of physical features comprises:
analyzing, by the at least one processor of the image recognition server, pixels of the at least one photograph;
detecting, by the at least one processor of the image recognition server, regions of pixels in the at least one photograph that differ in color and intensity values by predetermined threshold values from adjacent regions of pixels; and
identifying, by the at least one processor of the image recognition server, the regions of pixels in the at least one photograph as the set of physical features.

17. The method of claim 14, further comprising:
applying, by the at least one processor of the image recognition server, a cryptographic hashing of the feature data of the individual; and
storing the feature data regarding the set of physical features in the database based on the cryptographic hashing.

18. The method of claim 14, wherein the set of physical features comprises data regarding visual attributes of the individual, wherein the visual attributes of the individual comprise at least one of tattoos, piercing, scars, or markings on a body of the individual.

19. The method of claim 14, further comprising:
detecting a height of the individual; and
shifting a position of one or more of the plurality of cameras by a predetermined distance based on the height of the individual.

* * * * *